US010785607B2

(12) United States Patent
Balasubramanian et al.

(10) Patent No.: US 10,785,607 B2
(45) Date of Patent: Sep. 22, 2020

(54) CONCURRENT MULTI-LEVEL BROADCAST AND UNICAST FOR SMALL UNMANNED AERIAL VEHICLES AND V2X SYSTEMS

(71) Applicant: InterDigital Patent Holdings, Inc., Wilmington, DE (US)

(72) Inventors: Anantharaman Balasubramanian, San Diego, CA (US); Ravikumar V. Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/300,307

(22) PCT Filed: May 12, 2017

(86) PCT No.: PCT/US2017/032501
§ 371 (c)(1),
(2) Date: Nov. 9, 2018

(87) PCT Pub. No.: WO2018/044365
PCT Pub. Date: Mar. 8, 2018

(65) Prior Publication Data
US 2019/0116470 A1    Apr. 18, 2019

Related U.S. Application Data

(60) Provisional application No. 62/335,385, filed on May 12, 2016.

(51) Int. Cl.
*H04W 4/06* (2009.01)
*H04W 4/08* (2009.01)
(Continued)

(52) U.S. Cl.
CPC .......... *H04W 4/06* (2013.01); *H04B 7/18506* (2013.01); *H04W 4/08* (2013.01);
(Continued)

(58) Field of Classification Search
CPC ........... H04W 4/06; H04W 4/40; H04W 4/08; H04W 72/02; H04W 72/04; H04W 72/005; H04W 72/121; H04B 7/18506
(Continued)

(56) References Cited

U.S. PATENT DOCUMENTS

2012/0262339 A1*  10/2012  Garcia ...................... G01S 5/10
                                                                    342/387
2013/0258953 A1    10/2013  Huang et al.
(Continued)

OTHER PUBLICATIONS

3rd Generation Partnership Project (3GPP), R1-061702, "LTE System Performance Improvement by Unicast/MBMS Superposition and Interference Cancellation", Samsung, 3GPP RAN1 LTE Ad Hoc, Cannes, France, Jun. 27-30, 2006, 10 pages.
(Continued)

*Primary Examiner* — Candal Elpenord
(74) *Attorney, Agent, or Firm* — Condo Roccia Koptiw LLP

(57) ABSTRACT

Systems, methods, and instrumentalities are disclosed for processing a multi-level transmission sent on a common set of resources using superposition coding, comprising determining a first group radio network temporary identifier (GRNTI), wherein the GRNTI is associated with a broadcast transmission to a plurality of wireless transmit/receive units (WTRUs), determining a second GRNTI, wherein the second GRNTI is associated with a transmission to a subset of the plurality of WTRUs that received the first GRNTI, receiving the multi-level transmission, wherein the multi-level transmission comprises a first level message and a second level message, decoding the first level message from the multi-level transmission using the first GRNTI and preconfigured control information, and decoding the second level message from the multi-level transmission using the second GRNTI.

20 Claims, 10 Drawing Sheets

(51) Int. Cl.
  H04B 7/185      (2006.01)
  H04W 72/00     (2009.01)
  H04W 4/40       (2018.01)
  H04W 72/12     (2009.01)
(52) U.S. Cl.
  CPC ........... *H04W 4/40* (2018.02); *H04W 72/005* (2013.01); *H04W 72/121* (2013.01)
(58) Field of Classification Search
  USPC .......................................... 370/312, 328–330
  See application file for complete search history.

(56) References Cited

U.S. PATENT DOCUMENTS

| 2015/0124646 | A1  | 5/2015 | Yun et al. | |
| 2017/0006417 | A1* | 1/2017 | Canoy | H04L 63/126 |
| 2017/0069214 | A1* | 3/2017 | Dupray | G08G 5/0021 |
| 2017/0134080 | A1* | 5/2017 | Rahman | H04B 7/0456 |
| 2017/0195048 | A1* | 7/2017 | Sham | H04B 10/1129 |
| 2017/0245273 | A1* | 8/2017 | Li | H04W 72/0446 |
| 2017/0273057 | A1* | 9/2017 | Lee | H04W 72/1289 |
| 2019/0007812 | A1* | 1/2019 | Shilov | H04W 4/029 |

OTHER PUBLICATIONS

3$^{rd}$ Generation Partnership Project (3GPP), R1-151722, "Enhanced Superposition Schemes for MUST", ZTE, 3GPP TSG-RAN WG1 #80bis, Belgrade, Serbia, Apr. 20-24, 2015, 3 pages.

3$^{rd}$ Generation Partnership Project (3GPP), R1-151779, "Downlink Superposition Transmission Schemes at High Level", Alcatel-Lucent Shanghai Bell, Alcatel-Lucent, 3GPP TSG RAN WG1 Meeting #80bis, Belgrade, Serbia, Apr. 20-24, 2015, 4 pages.

3$^{rd}$ Generation Partnership Project (3GPP), R1-153041, "Superposition Transmission in PMCH", MediaTek Inc., 3GPP TSG RAN WG1 Meeting #81, Fukuoka, Japan, May 25-29, 2015, 6 pages.

3$^{rd}$ Generation Partnership Project (3GPP), R1-162374, "Discussion on Multi-Cell Multicast/Broadcast Enhancements for V2V Communication", Intel Corporation, 3GPP TSG RAN WG1 Meeting #84bis, Busan, Korea, Apr. 11-15, 2016, 3 pages.

3$^{rd}$ Generation Partnership Project (3GPP), R1-162418, "Enhancement of Multi-Cell Multicast/Broadcast for V2V", ZTE, 3GPP TSG-RAN WG1 Meeting #84bis, Busan, Korea, Apr. 11-15, 2016, 4 pages.

3$^{rd}$ Generation Partnership Project (3GPP), R1-162700, "PDSCH-Based Enhancements for V2X Multicasting", Samsung, 3GPP TSG RAN WG1 Meeting #84bis, Busan, Korea, Apr. 11-15, 2016, 5 pages.

3$^{rd}$ Generation Partnership Project (3GPP), R1-163045, "Superposition Transmissions for MUST", Qualcomm Incorporated, 3GPP TSG RAN WG1 #84b, Busan, Korea, Apr. 11-15, 2016, 4 pages.

3$^{rd}$ Generation Partnership Project (3GPP), TR 22.885 V14.0.0, "Technical Specification Group Services and System Aspects, Study on LTE Support for Vehicle to Everything (V2X) Services (Release 14)", Dec. 2015, 50 pages.

3$^{rd}$ Generation Partnership Project (3GPP), TR 22.891 V1.3.2, "Technical Specification Group Services and System Aspects, Feasibility Study on New Services and Markets Technology Enablers, Stage 1 (Release 14)", Feb. 2016, 95 pages.

3$^{rd}$ Generation Partnership Project (3GPP), TR 36.859 V13.0.0, "Technical Specification Group Radio Access Network, Study on Downlink Multiuser Superposition Transmission (MUST) for LTE (Release 13)", Dec. 2015, 48 pages.

Federal Aviation Administration, "Automatic Dependent Surveillance-Broadcast", Available at https://www.faa.gov/nextgen/how_nextgen_works/new_technology/adsb/, May 24, 2018, 2 pages.

Kim et al., "Superposition of Broadcast and Unicast in Wireless Cellular Systems", IEEE Communications Magazine, Advances in Mobile Multimedia Broadcasting: Part II, Jul. 2008, 8 pages.

* cited by examiner

CONCURRENT MULTI-LEVEL BROADCAST AND UNICAST FOR SMALL UNMANNED AERIAL VEHICLES AND V2X SYSTEMS

CROSS-REFERENCE TO RELATED APPLICATION

This application is the National Stage entry under 35 U.S.C. § 371 of Patent Cooperation Treaty Application PCT/US2017/032501, filed May 12, 2017, which claims the benefit of U.S. Provisional Patent Application No. 62/335,385 filed on May 12, 2016, the entire contents of which are hereby incorporated by reference as if fully set-forth herein for all purposes.

BACKGROUND

The development of technology for drones, also known as small unmanned aerial vehicles (sUAVs), may affect a number of industries. Moreover, the increasing popularity of drones may affect economic, social, security, environmental, political, and legal landscapes over time (such as, for example, the next twenty years). Interestingly, the civilian market is growing faster than the military market. Non-military uses may include construction, agriculture, energy, utilities, insurance, mining, real estate, package delivery, news media, and film production.

A notable increase in investments related to drone technology is occurring. For example, investments in 2015 related to drone technology may be more than triple the total from the previous five years combined. The U.S. Federal Aviation Administration (FAA) has predicted that UAV spending may reach $89 billion (cumulative) from 2013 to 2023.

Wireless communication functionality may be of particular importance to drones, as well as other types of Vehicle-to-Everything (V2X) communications.

SUMMARY

Systems, methods, and instrumentalities are disclosed for processing a multi-level transmission sent on a common set of resources using superposition coding, comprising determining a first group radio network temporary identifier (GRNTI), wherein the GRNTI is associated with a broadcast transmission to a plurality of wireless transmit/receive units (WTRUs), determining a second GRNTI, wherein the second GRNTI is associated with a transmission to a subset of the plurality of WTRUs that received the first GRNTI, receiving the multi-level transmission, wherein the multi-level transmission comprises a first level message and a second level message, decoding the first level message from the multi-level transmission using the first GRNTI and preconfigured control information, and decoding the second level message from the multi-level transmission using the second GRNTI. The WTRUs may be unmanned aerial vehicles (UAVs). The first level message may be an Automatic Dependent Surveillance-Broadcast (ADS-B). The subset of the plurality of WTRUs may be in a common geographical vicinity (for example, altitude or location). The subset of the plurality of WTRUs may be using a common application.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate one or more message charts, which are meant to be exemplary. Other embodiments may be used. The order of the messages may be varied where appropriate. Messages may be omitted if not needed, and, additional messages may be added.

Figure 1A:
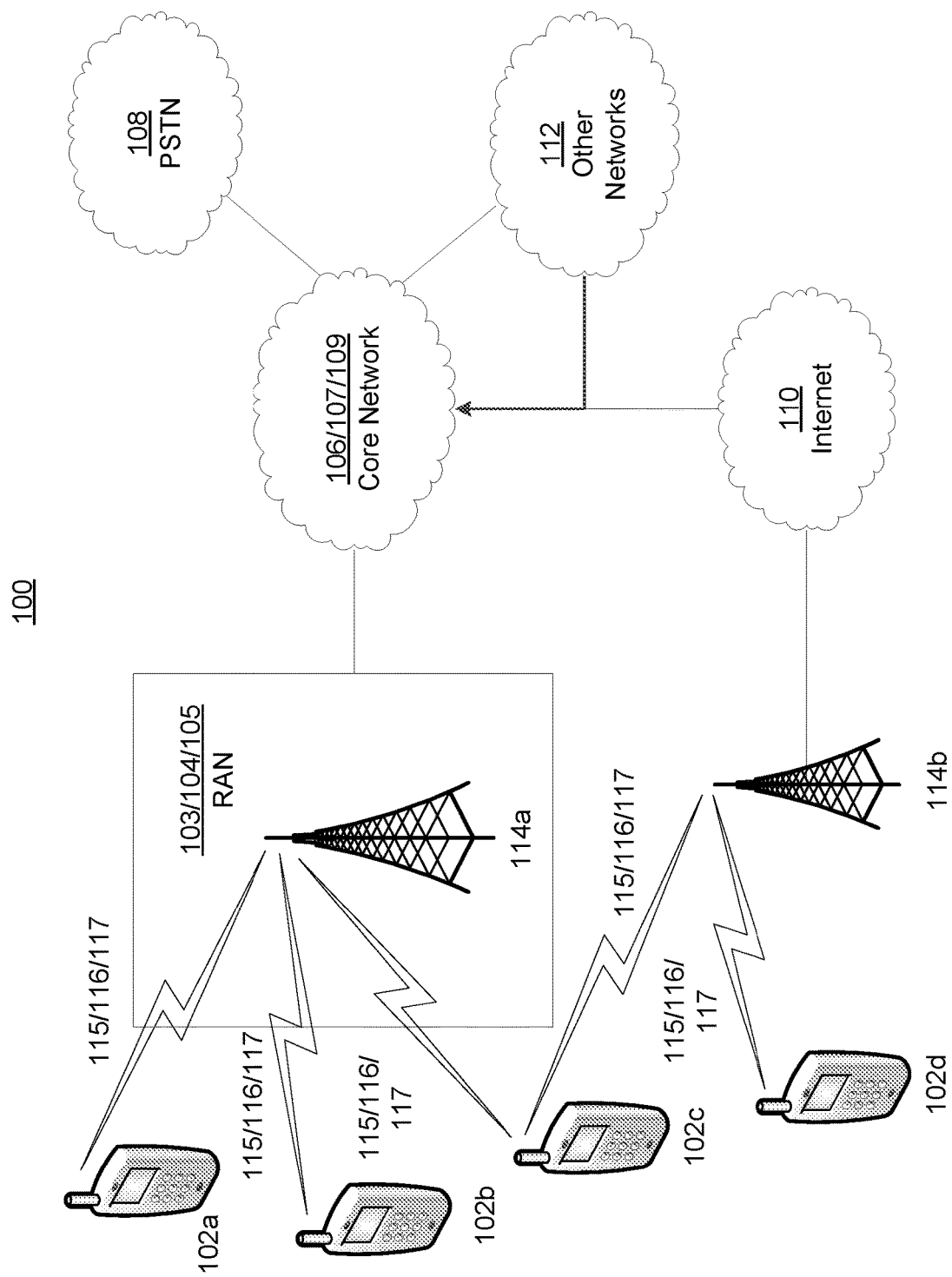
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with one or more of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
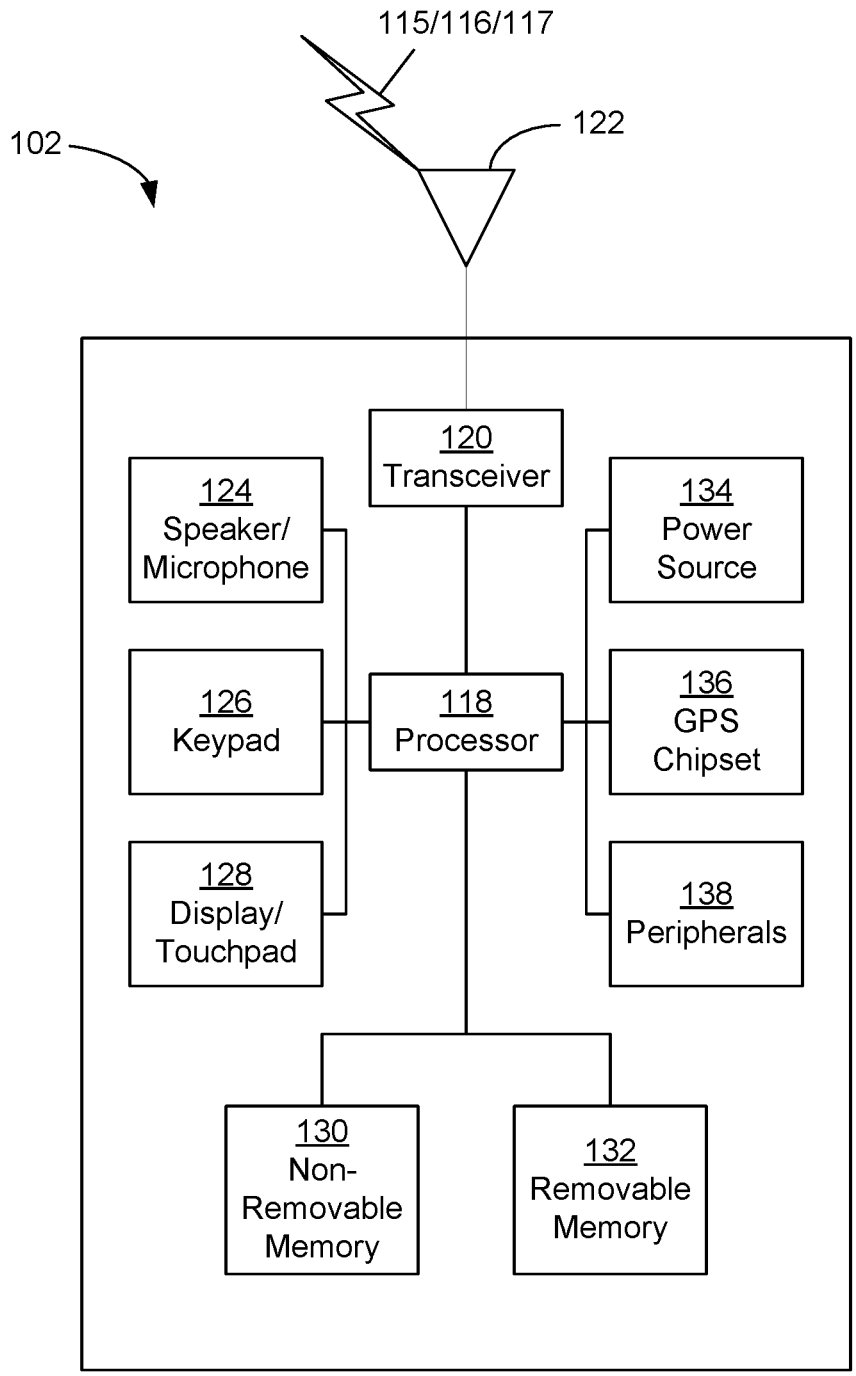
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
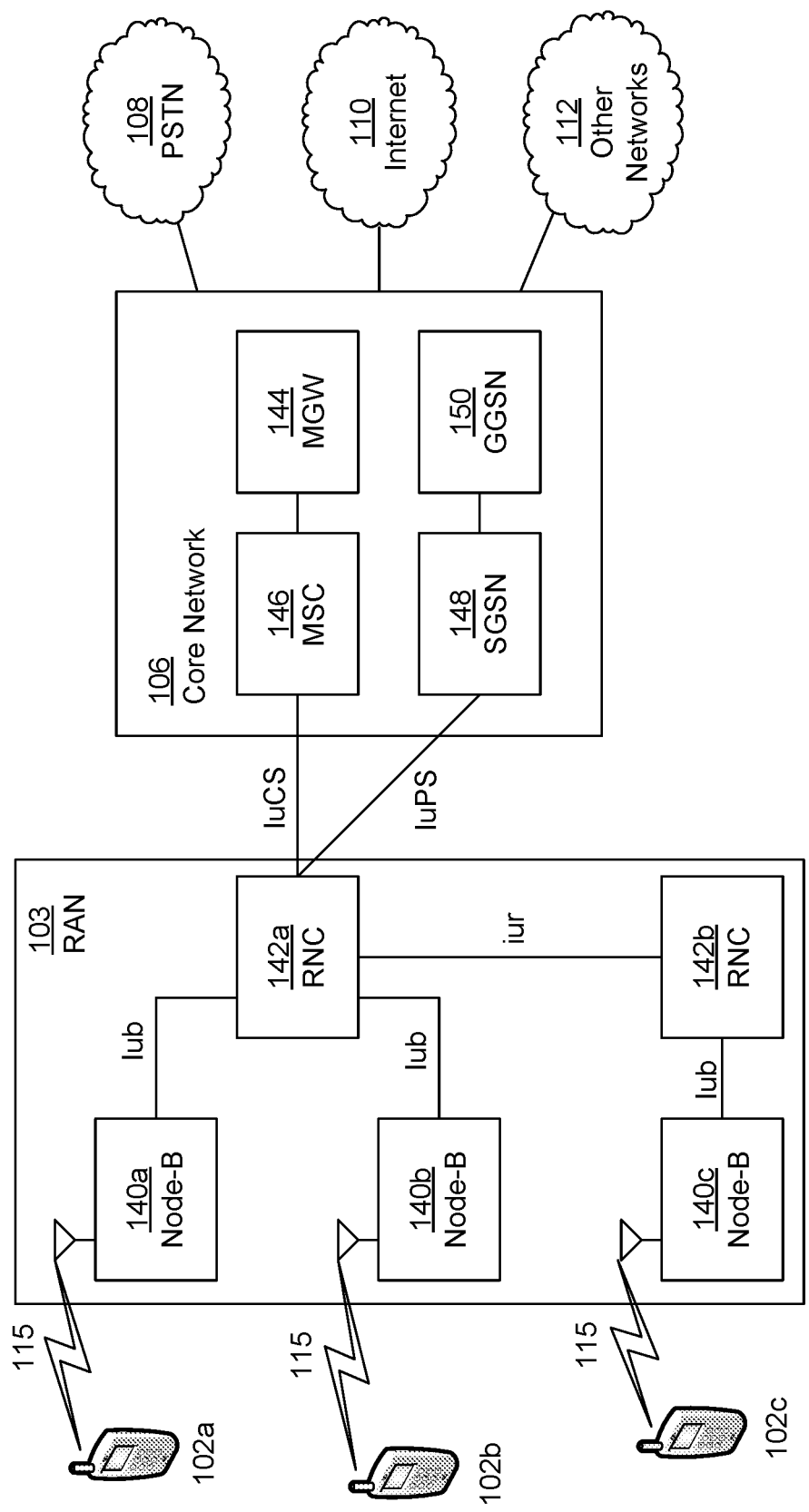
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
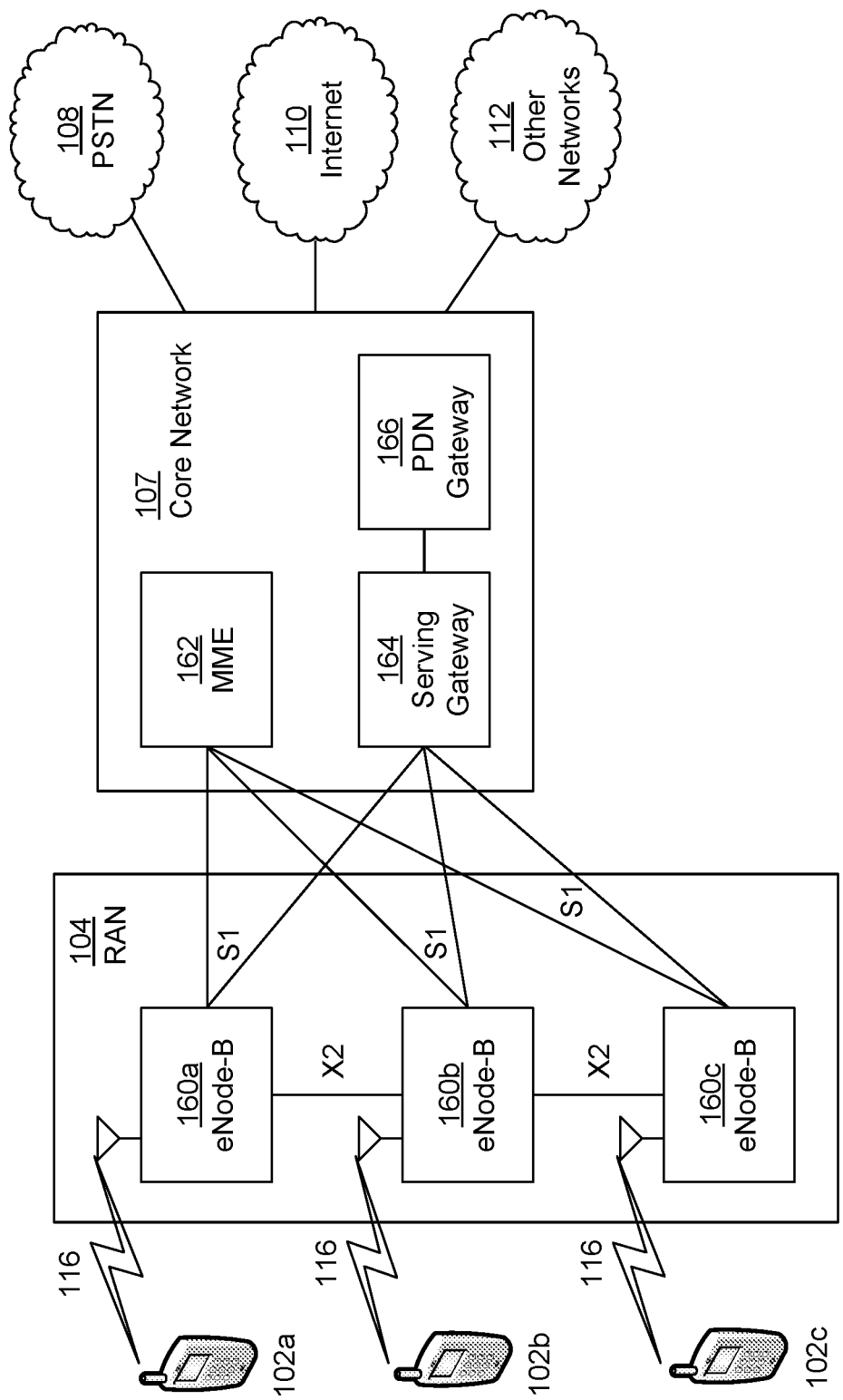
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
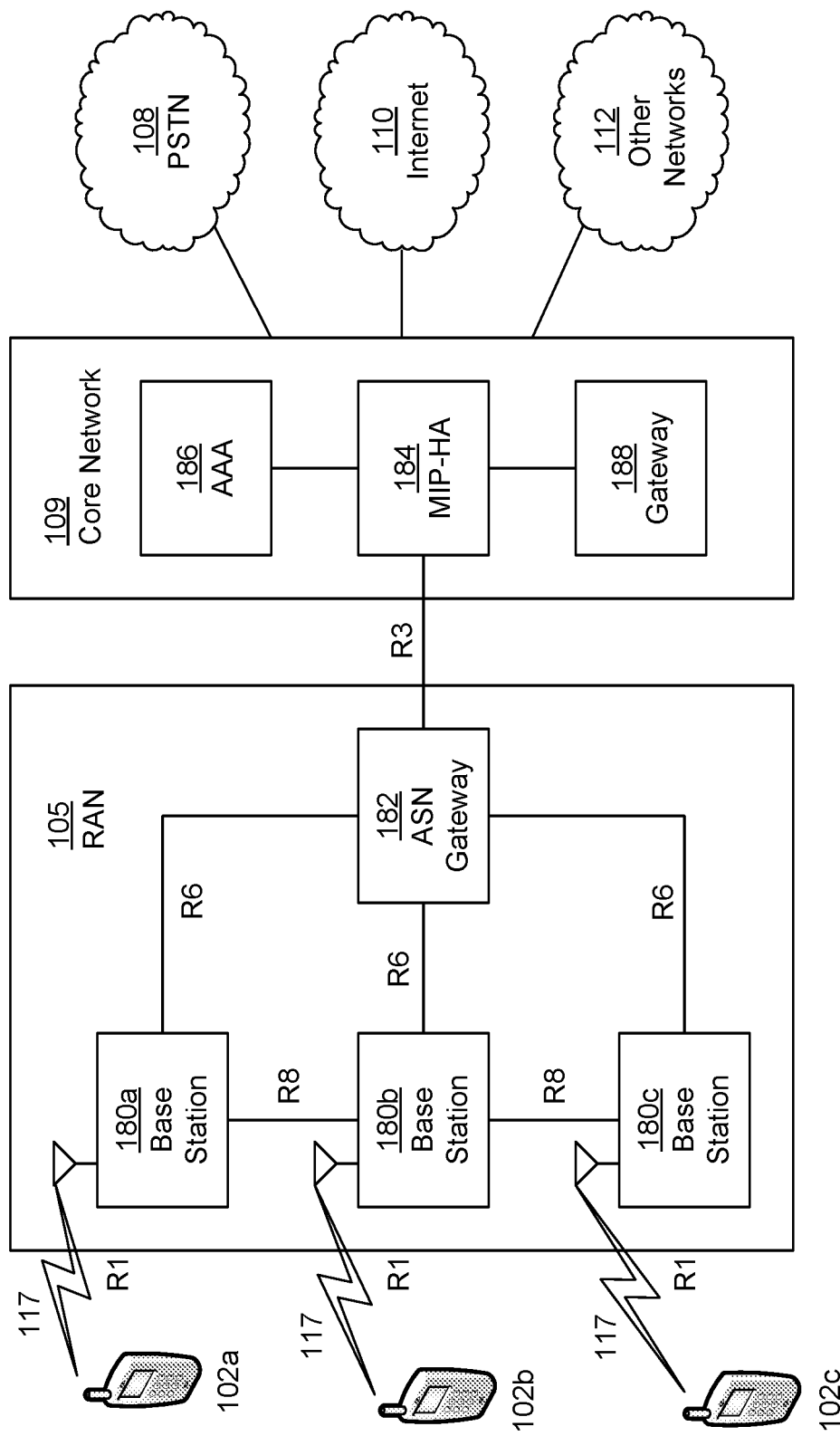
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Wireless communications may be a key for success of small unmanned aerial vehicles (sUAV) in commercial and consumer markets. Wireless communications may enable sUAV command and control capabilities. Wireless communications may enable beyond line-of-sight operation for sUAVs. Wireless communications may enable radio based collision detection and avoidance. A UAV/sUAV may be considered a type of wireless transmit/receive unit (WTRU), for example if the UAV/sUAV includes components configured to perform wireless communication transmission and/or reception. The terms WTRU, sUAV, UAV, drone, unmanned vehicle, etc. may be used interchangeably herein. Further, although some examples described herein may be described with reference to sUAVs but may also be more generally applicable to any type of autonomous vehicle or any other WTRU (and vice versa). For example, the techniques described herein may also be applicable to vehicular applications and/or Internet of Things (IoT) type applications.

Wireless communications may be utilized to enable reliable operation and safe integration of sUAVs into the national airspace system (NAS). There has been research interest in addressing the beyond line of sight communications for sUAVs. For example, the U.S. National Aeronautics and Space Administration (NASA) may be developing sUAV traffic management (UTM) architecture to integrate sUAVs into NAS. Several OEMs and cellular network operators may desire to enable sUAV communications via cellular networks.

It would be desirable to develop Vehicle-to-Everything (V2X) for sUAV communications. While technologies similar to DSRC (e.g., 802.11p) may conceptually be used for sUAV, 802.11p has limitations such as scalability and communication range etc. For example, as 802.11p uses a CSMA protocol, the end-to-end delays experienced at high vehicle densities may be very high, and hence, may not be suitable to meet the latency requirements for vehicle to vehicle systems. It may be more likely that cellular infrastructure based communication systems are adopted for sUAVs. For example, LTE may be pursuing work/study items for V2X standardization which may emphasize the need for cellular communication architecture for vehicular systems.

Figure 2:
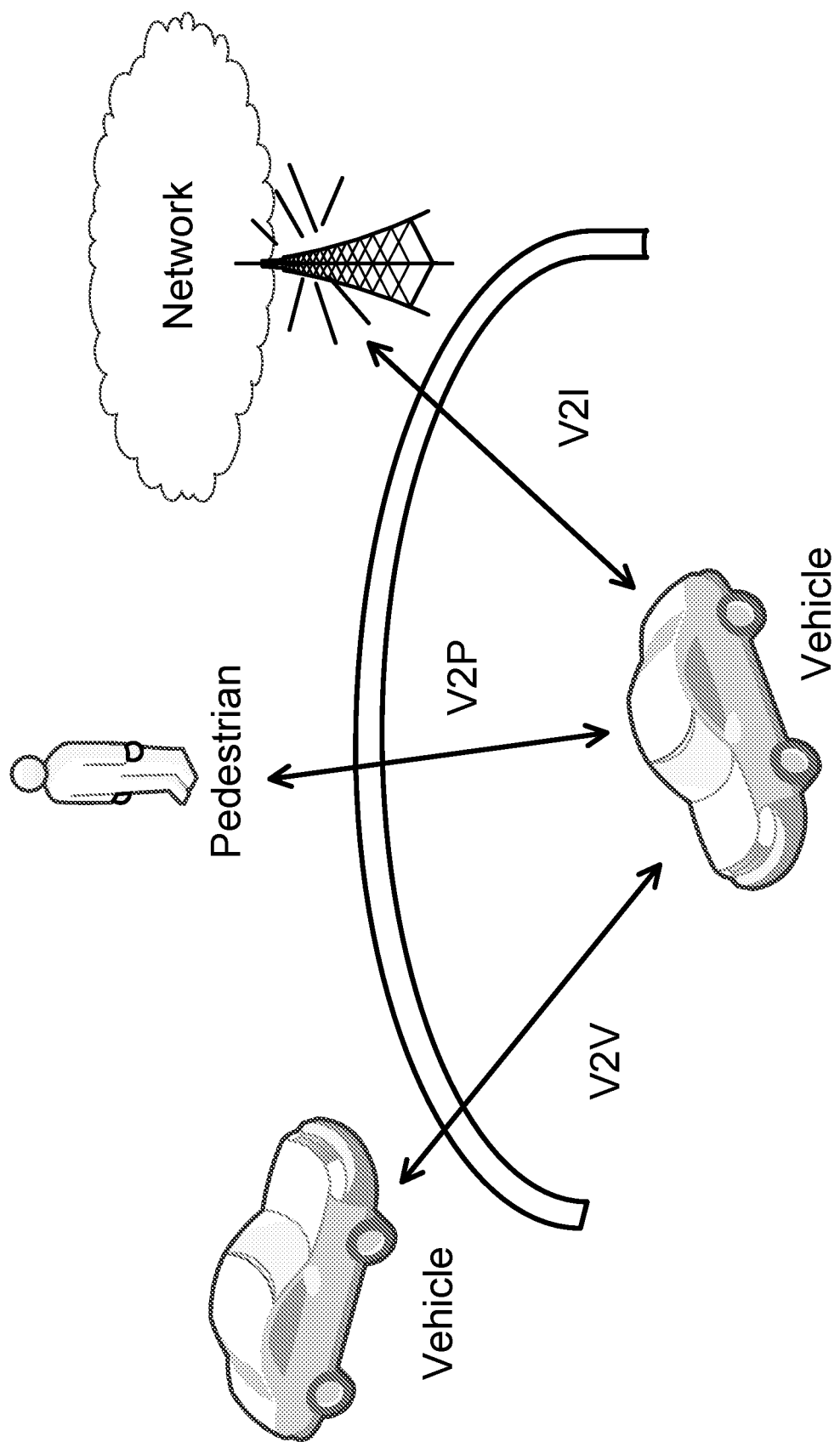
FIG. 2 is a diagram of an example of three types of Vehicle-to-Everything (V2X) communications: Vehicle-to-Vehicle (V2V); Vehicle-to-Infrastructure (V2I); and Vehicle-to-Pedestrian (V2P).

FIG. 2 is a diagram explaining three types of Vehicle-to-Everything (V2X) communications: Vehicle-to-Vehicle (V2V) communications; Vehicle-to-Infrastructure (V2I) communications; and Vehicle-to-Pedestrian (V2P) communications. The techniques described herein may be applicable to V2X type communications.

Recently, interest has developed in using superposition coding to increase spectral efficiency. For example, there is an ongoing effort towards standardization of multi-user superposition transmission (MUST) for Rel-13/14.

A problem that may be addressed in LTE V2X systems, and also for future sUAV systems, may be the ability to deliver safety/cooperative awareness messages (CAM) or Automatic Dependent Surveillance-Broadcast (ADS-B)-like safety messages to groups of vehicles. Though eMBMS architecture may already have been designed for broadcast/multicast services in LTE 4G systems, eMBMS was designed assuming coordination from nearby cells to function effectively (e.g., from a latency perspective). To address this shortcoming of eMBMS, single cell-point to multipoint (SC-PTM) has been proposed in Rel-13/14 where broadcasting may be performed by every cell independently.

Different group unicast/multicast problems may be addressed herein to increase the efficiency of SC-PTM (and also eMBMS) broadcast systems. Note that although sUAVs are used as an example herein, other autonomous or unmanned vehicles/automobiles may be used. The techniques described herein may also be applicable to other types of devices and to groups of WTRUs generally.

For example, concurrent multi-level broadcasting may be used to enable broadcasting of multiple messages (e.g., such as multiple V2V safety/cooperative awareness message (CAM)) concurrently to different subset of devices (e.g., such as UAVs/vehicles) in the same geographical region or vicinity. The concurrent multi-level messages may utilize superposition coding in order to transmit multiple messages (e.g., a first level message, a second level message, a third level message, etc.) using a common set of transmission resources (e.g., in the time-frequency domain). Concurrent multi-level broadcasting may be used to enable broadcasting messages (e.g., such as CAM or ADS-B like messages) to some or all the users of a geographical vicinity while being able to transmit individual messages (e.g., such as ADS-B like messages) applicable to individual devices/vehicles in a resource efficient way. Further, methods for grouping subsets devices (e.g., such as UAVs) to enable efficient spectrum usage in a non-orthogonal fashion, for example utilizing the same set of resource blocks without spatially separating the messages (e.g., messages intended for different subsets of vehicles) using superposition coding are disclosed.

For example, a method of performing a multi-level message may include determining a first-level broadcast message and a second-level message, performing a superposition coding of the first-level broadcast message and the second-level message, and sending the first-level broadcast message to a first set users and concurrently sending the second-level message a second set of users. The second set of users may be a sub-set of the first set of users. The second set of the users may cancel the first-level broadcast message and decode the second-level message. The users may be vehicles, including small unmanned aerial vehicles (sUAVs). The first set of users may correspond to all users in a geographical vicinity.

The multi-level message may include a first-level broadcast message, a second-level message, and a third-level message with superposition coding, and sending the first-level broadcast message to a first set users, concurrently sending the second-level broadcast message to a second set of users, and concurrently sending the third-level broadcast message to a third set of users.

The same sets of resource blocks may be used for sending the first-level broadcast message, the second level message, and/or the third-level message. The first level broadcast message may be decoded using a first group radio network temporary identifier (GRNTI), the second-level message may be decoded using a second GRNTI, etc. The superposition coding may be based on the superpositon of a modulated version of the first level broadcast message and a modulated version of the second-level message. For example, each of the first-level broadcast message and the second-level message may be modulated using quadrarture phase shift keying (QPSK) prior to performing the superposition. The superposition may result in the first and second level messages being mapped to a constellation out of a plurality of potential constellations. The constellation may represent bits of each of the first and second level messages.

Figure 3:
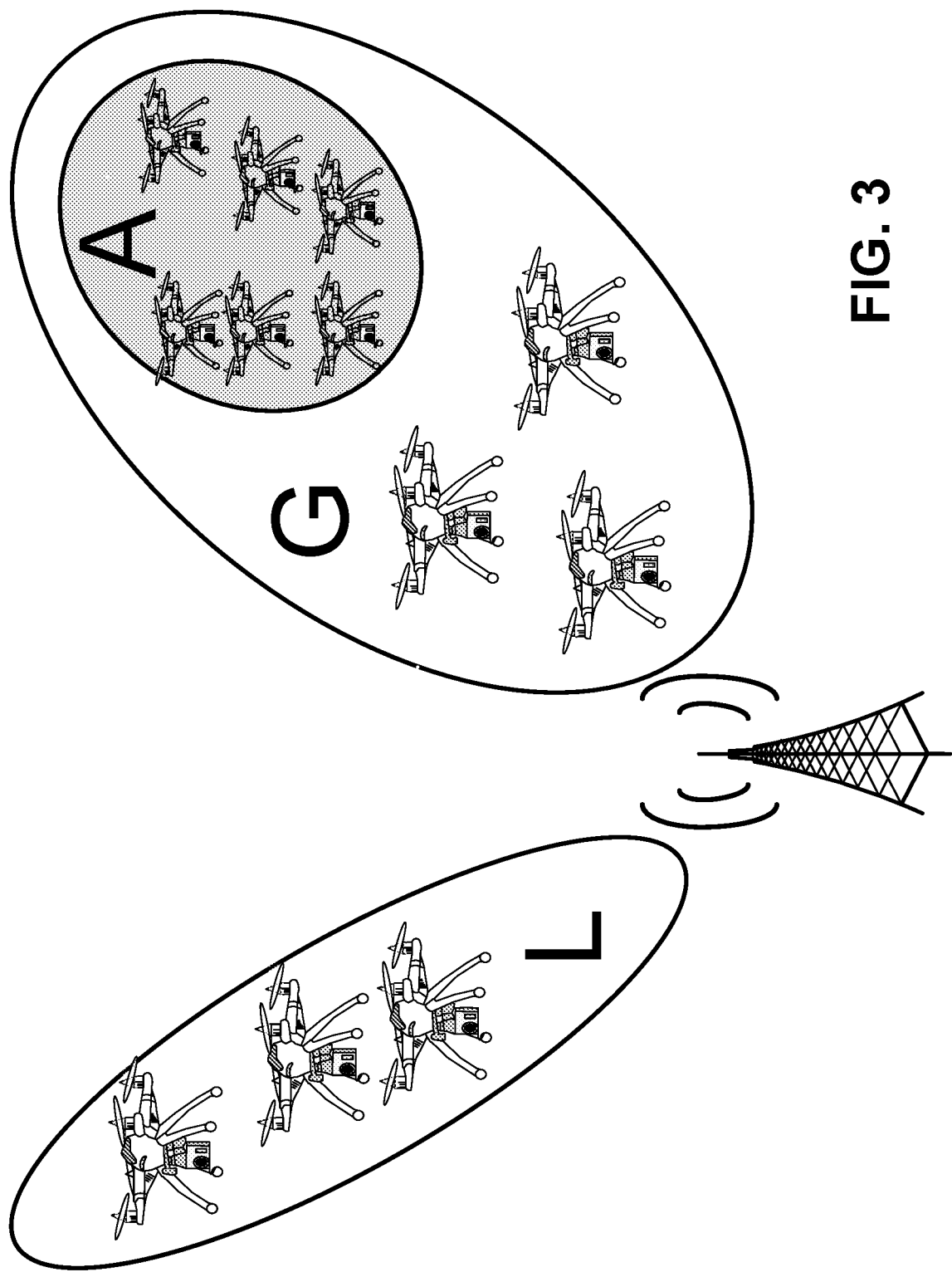
FIG. 3 is a diagram of an example of an eNodeB broadcasting messages to different geographical areas.

FIG. 3 is a diagram of an eNodeB broadcasting messages to different geographical areas. An eNodeB may provide connectivity to enable command and control of a vehicle, for example, to a sUAV (for example, all sUAVs) in its coverage area. A sUAV (e.g., every sUAV) may transmit ADS-B like messages on the uplink. The eNodeB may group the messages received from the sUAVs according to the geographical location of the sUAVs. Geographical vicinity may include, for example, two dimensional vicinity, such as in a common region, or three dimensional vicinity, such as at a common altitude. For example, in FIG. 3, two geographical regions, represented as geographical area 'G' and geographical area 'L' are provided. ADS-B messages pertaining to a particular geographical area may be broadcasted to the sUAVs contained in that area. The eNodeB may perform two independent ADS-B like broadcasts, such as one broadcast message for sUAVs in area 'G', and another for sUAVs in area 'L'.

Messages to different geographical regions may be coded independently and may utilize separate resource blocks for transmission. A broadcast message intended for a geographical area may be assigned a unique Radio Network Temporary Identifier (RNTI). The RNTI may be a Group Radio Network Temporary Identifier (GRNTI). Examples herein may be described with respect to use of GRNTIs, but such examples may also be applicable to other types of RNTIs. It is understood that a GRNTI may refer to a single WTRU (e.g., when a group size=1). An sUAV in a particular geographical area may use the appropriate GRNTI to decode the message (for example, the message that it is interested in). Geography based broadcasting may be pursued. A geography based broadcast may be employed by the eNodeB to transmit ADS-B like messages.

In the geographical area 'G,' there may be several sUAVs scattered throughout the area. Additionally, a "swarm of sUAV" represented by 'A', may be within the geographical area 'G'. However, the sUAVs in swarm 'A' may undertake activities or be experiencing conditions that are different from the remainder of the sUAVs (e.g., scattered sUAVs) in the geographical area 'G'. For example, the sUAVs in swarm 'A' may be performing a joint operation (such as, for example, searching for an intruder or suspect as in a 5G SMARTER use case). In another use case, the sUAV in swarm 'A' may be in a dangerous location (such as, for example, near to an airport), such that a warning message may need to be provided to the sUAVs in swarm 'A', but the warning message may not need to be provided to other sUAVs in geographical area 'G'. For example, the sUAVs outside swarm 'A' may not be provided this warning message.

Example parameters of the ADS-B like broadcast system for the scenario depicted in FIG. 3 may be stated as follows. The sUAVs in the geographical area 'G' may attempt to obtain a message, 'm1' (for example, a message common to the geographical area 'G', including the sUAVs in swarm 'A'). For example, 'm1' may be a broadcast message. The sUAVs in swarm 'A' may attempt to obtain another (e.g., private) message 'm2'. For example, 'm2' may be a broadcast message. The message 'm2' may be applicable to (e.g., only applicable to) the sUAVs in swarm 'A' (e.g., but not to other sUAVs in the geographical area 'G').

The 'm1', 'm2' example may be treated as two independent broadcast systems: BC1: Message for sUAVs in geographical area 'G' and sUAVs in swarm 'A' (e.g., common message); and BC2: Message for sUAVs in swarm 'A' only (e.g., private message). In this example, the sUAVs in geographical area 'G' that are outside of swarm 'A' may subscribe to BC1 only, while the sUAVs in swarm 'A' may subscribe to both BC1 and BC2.

This disclosure may provide an efficient method of performing a two-level broadcast. Methods for extending this to a multi-level broadcast system may be outlined.

The aforementioned broadcast scenario may be extended to a case when concurrent unicast and multicast transmission may be performed.

Figure 4:
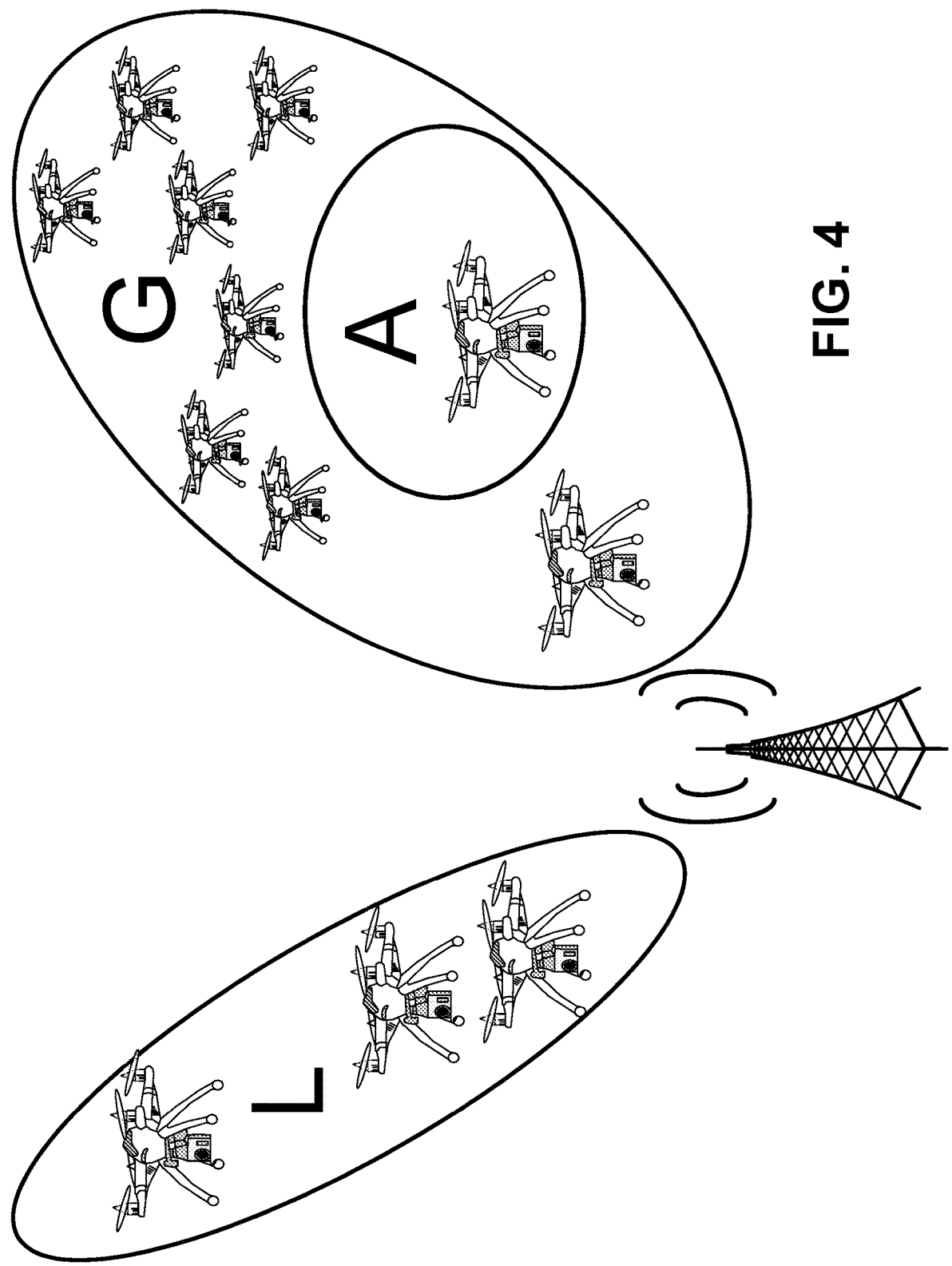
FIG. 4 is a diagram of an example of an eNodeB unicast and multicast broadcasting messages to a geographical area.

FIG. 4 is a diagram of an example of an eNodeB unicast and multicast broadcasting messages to a geographical area (e.g., geographical area 'G'). An ADS-B like message applicable to a particular sUAV 'A' (or, alternatively, a group of sUAVs) may be transmitted along with a common ADS-B like message intended for all sUAVs in a geographical area (e.g., geographical area 'G'). For example, the sUAV 'A' may receive a unicast ADS-B like message in addition to the ADS-B like broadcast message intended for all sUAVS in geographical area 'G'. The ADS-B like broadcast message intended for all sUAVS in geographical area 'G' may have a first GRNTI. The first GRNTI may be indicated, for example, using system information. The unicast ADS-B like message may have a second GRNTI. The second GRNTI may be indicated, for example, using a dedicated configuration. The dedicated configuration may be configured via a Radio Resource Control (RRC) signaling message. The dedicated configuration may be configured via a Medium Access Control (MAC) element.

The message for sUAV 'A' may be a broadcast message, multicast message, or unicast message. Superposition coding for different levels of broadcast messages (and/or unicast message) may be leveraged. For example, a two-level broadcast message may comprise a first-level broadcast message that may be broadcasted to all users, and a second-level broadcast message that may be broadcasted to a subset of users. Let $s_1$ denote the first level broadcast message and $s_2$ denote the second-level broadcast message. The transmitted broadcast message, s may be given by $s=\sqrt{\alpha}s_1+\sqrt{1-\alpha}s_2$, where $\alpha$ is the power ratio.

Figure 5:
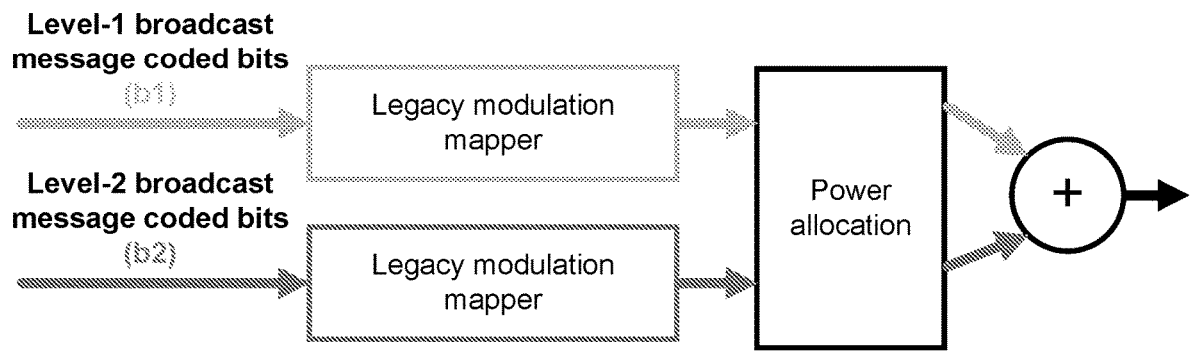
FIG. 5 is a diagram of an example of a Category-1 architecture for a two-level broadcast message.
Figure 6:
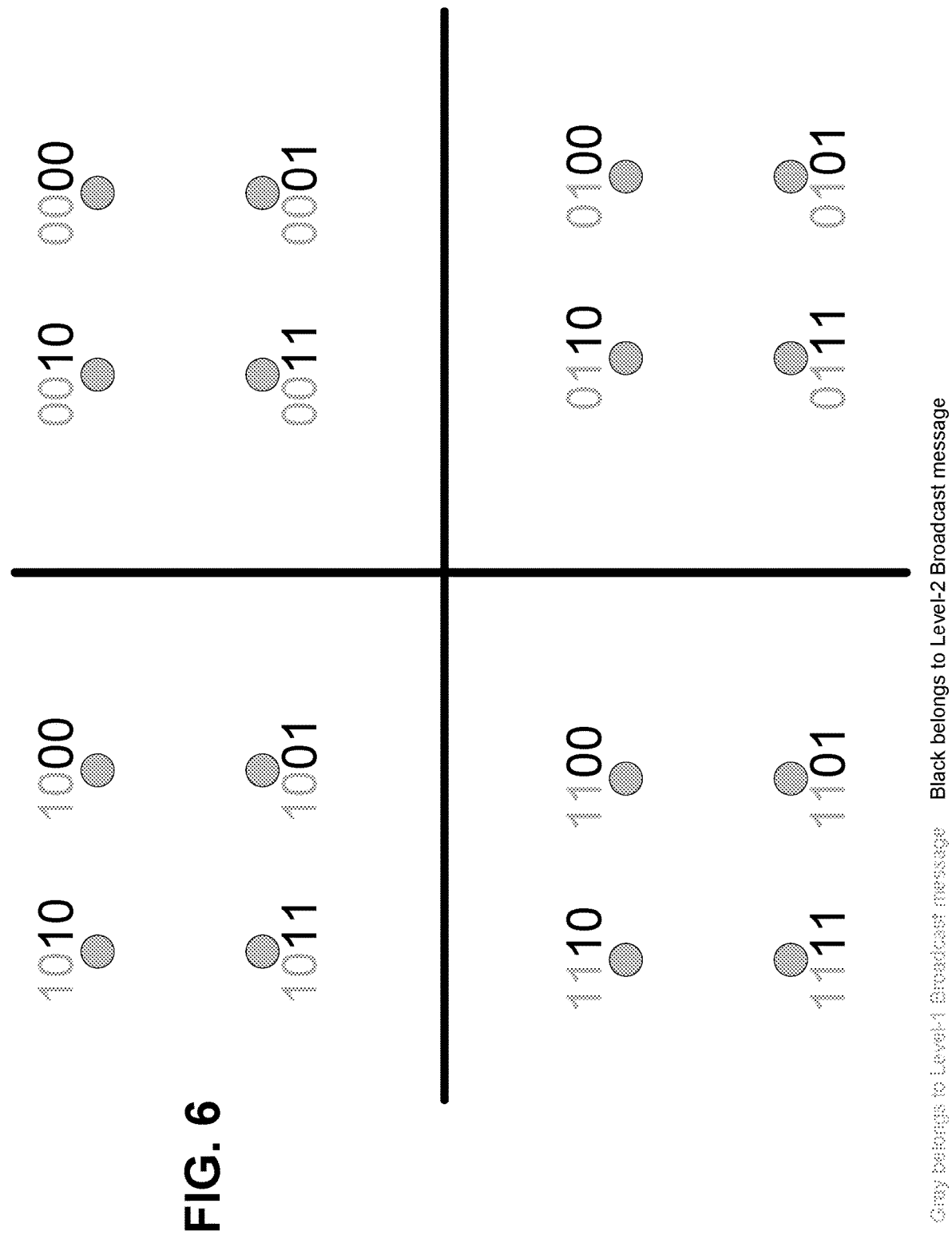
FIG. 6 is a diagram of an example constellation for a superposed broadcast message.

FIG. 5 is a diagram of an example of an architecture for a Category-1 superposition coding for a two-level broadcast message. Similar architectures for Category-2 and Category-3 may be extended for the two-level broadcast scenario. Assuming that $s_1$, $s_2$ belong to a QPSK constellation (although, in principle, it may belong to any constellation), the superposed constellation s is depicted in FIG. 6. The same resource blocks may be used to transmit both the level-1 and level-2 broadcast messages.

FIG. 6 is a diagram of an example constellation for superposed broadcast message (assuming level-1 and level-2 broadcast messages are from QPSK). The gray color (left two digits of each four digit group) may belong to a level-1 broadcast message while the black color (last two digits of each four digit group) may belong to a level-2 broadcast message.

The two levels of broadcast messages may be decoded by the users. For example, assume that eNodeB uses GRNTI1 for a level-1 broadcast message and GRNTI2 a level-2 message. Using FIG. 3 as an example, all sUAVs (such as those in the geographical area 'G', including swarm 'A') may be provided with GRNTI1. The users may be able to decode the level-1 broadcast message.

The sUAVs in swarm 'A', may (e.g., may also) be provided with GRNTI2. As the users in swarm 'A' already have the level-1 message (e.g., by virtue of being in geographical area 'G', as described), the users may cancel it from the received message, and together with GRNTI2 decode the level-2 message. Higher levels of messages may be obtained by cancelling the lower level messages.

The proposed superposition of the two levels of messages may use the same set of resource blocks. This may be spectrally efficient compared to treating the two-level approach as two independent broadcast messages (which may rely on the use of two different sets of resource blocks for transmission of messages).

Compared to multi-user superposition transmission (MUST), proposed superposition of the two levels of the broadcast messages may not require explicit signaling from the eNodeB to cancel lower levels of messages for decoding the higher level message (thereby avoiding significant control overhead). Explicit signaling from eNodeB is required for cancelling the interference of lower layers in MUST. This may amount to a significant control overhead because, in the case of code-word interference cancellation (CWIC), the entire PDSCH information may need to be provided including the modulation order, GRNTI, MCS, etc.

The proposed superposition of the two levels of messages, by contrast, may result in the sUAV already having the lower level message codeword obtained from the lower level broadcast message, that it may use along with the higher level GRNTIs, to obtain the higher level messages.

Multi-level broadcast and multicast/unicast messages may be created using superposition coding as well.

Figure 7:
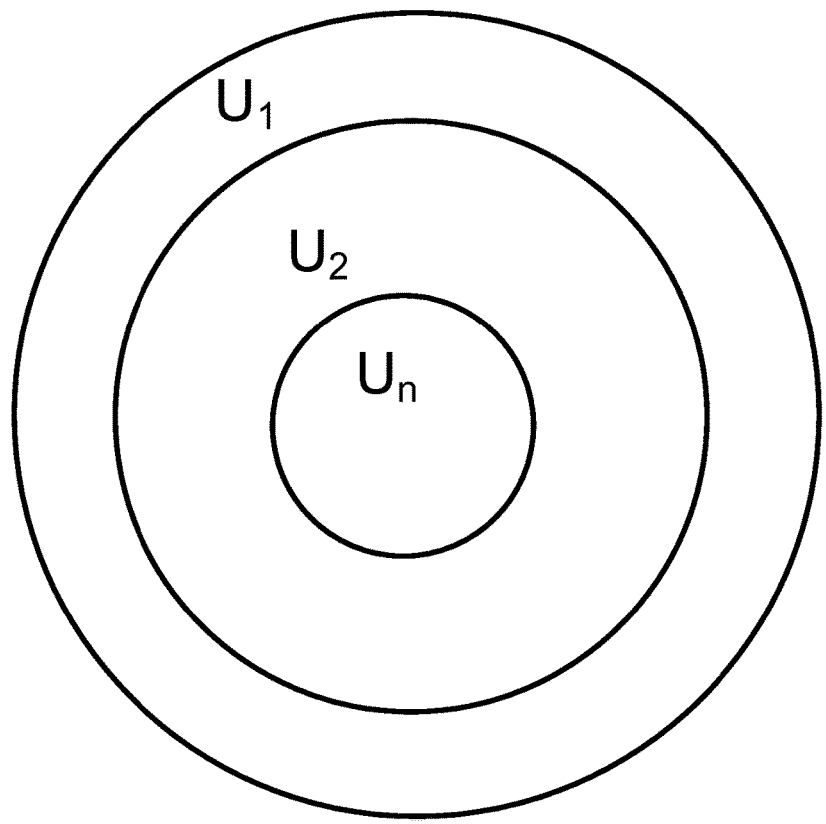
FIG. 7 is a diagram of an example of a multi-level broadcast messaging.

FIG. 7 is a diagram of an example of a multi-level broadcast messaging. Let $U_n \subset U_{n-1} \ldots \subset U_1$ represent sUAVs in a geographical area. The sUAVs in $U_n$ receive "private" ADS-B messages, in addition to all the "common" ADS-B messages received by $U_{n-1}$. A n-level broadcast superposition message may be transmitted, with the eNodeB providing the appropriate GRNTI information to the appropriate sUAV groups to be able to decode the messages. For example, for the case n=3, $U_3$ may be provided with {GRNTI1, GRNTI2, GRNTI3}, while $U_2$ may be provided with {GRNTI1, GRNTI2}, and $U_1$ may be provided with GRNTI1. Multi-level broadcasting may be accomplished with the same resource. The decoding structure of each level may be similar to the two level case, where higher layers are obtained by canceling lower layers of interference. The first GRNTI may be indicated, for example, using system information. The second GRNTI and third GRNTI may be indicated, for example, using a dedicated configuration. The dedicated configuration may be configured via a RRC signaling message. The dedicated configuration may be configured via a MAC control element.

Concurrent multicast and unicast transmission may be provided. A private ADS-B like message for a particular sUAV may be transmitted along with a common message. Performing superposition of a unicast message with the common broadcast message is desirable. For example, there may be no need for the eNodeB to signal additional information (except GRNTIs) for cancelling the lower layer interference for decoding the private message. The lower layer message may be the common broadcast message which the sUAV has already decoded. Performing a unicast (e.g., a single unicast) may provide an opportunity to leverage the multi-user diversity such that the eNodeB may choose the "best" user among the users in the geographical area to increase the spectral efficiency.

A multiple unicast may be performed along with the broadcast message, albeit with higher complexity. In this case, the eNodeB may need to signal the users to perform interference cancellation. For simplicity, assume that there are two unicast messages applicable to two different sUAVs, and a common message applicable to all sUAVs. The lower level broadcast message may be decoded by all the sUAVs as the GRNTI is made available by eNodeB to all users in the geographical region. The eNodeB may provide GRNTI-1 to the first unicast sUAV. The first sUAV may get its private message after cancelling the lower layer message that it obtained. The eNodeB may provide GRNTI-2 (and all the PDSCH information of the first unicast message) to a second unicast sUAV. The second sUAV may get its private message after cancelling the lower layer message and the PDSCH information of the first unicast message received from eNodeB.

A concurrent unicast and multicast may be applied in SC-PTM scenarios. The unicast message (private) may not have to be transmitted to the MBSFN cells (e.g., which might have been the case if one had to apply the superposition coding in the eMBMS scenario).

Multi-level group formation may occur and signaling aspects may be developed. In a case of SC-PTM, the eNodeB may use the channel gains of users, together with the feedback it receives on the uplink, to group the users (such as, for example, to balance the tradeoff between the resources used and spectral efficiency). For example, if grouping is done such that the difference in channel gains between the weakest user and the strongest user is high, then the spectral efficiency of the broadcast group (e.g., the sum rate of the broadcast group), tends to be low. This is due to the fact the weakest member in the broadcast group may still need to be able to decode. Performing unicast transmissions for the broadcast data may result in using more resources in such a scenario.

An adaptive strategy with switching periods may be implemented. The adaptive strategy may determine whether or not superposition coding is enabled. If the gains in performing superposition coding are not high enough, a simple broadcast may be sufficient. An adaptive strategy may be used to switch between superposition coding and the typical broadcast/unicast, based on the channel gains of users.

Adaptive switching may be performed on a per TTI basis, where any TTI may be allocated for superposition coding, or for typical broadcast/unicast transmissions. Specific TTIs may be reserved for superposition coding. These may be signaled either via RRC signaling message(s) or via a Layer 2 message which may include a dynamic indication to the sUAV. A bitmap related to the specific TTIs allocated for superposition coding may be included in these messages.

Specific switching periods may be defined where the transition occurs from typical broadcast/unicast transmissions to superposition coding or vice-versa. These switching periods may be pre-determined and may be configured via higher layer signaling. Switching periods may be signaled dynamically via physical layer control signaling.

Semi-persistent superposition coding periods may be implemented. In order to optimize the signaling overhead, a semi-persistent superposition coding period (for example, analogous to semi-persistent scheduling) may be defined where superposition/one layer coding is performed in a periodic manner. The periodicity may be indicated through higher layer control signaling mechanisms, such as via RRC or L2 messaging.

This periodicity may be defined as which particular TTIs, and/or how many consecutive TTIs, may be utilized for superposition coding. For example, superposition based broadcast may be performed such that TTI mod 2=0 (every other subframe). For example, TTI 1 with 2 consecutive TTIs and TTI 6 with 3 consecutive TTIs may be allocated for superposition coding, and the rest of the TTIs may be allocationed in a conventional manner.

Feedback for superposition coding may be implemented. The eNodeB may use an appropriate metric to balance this in forming appropriate grouping. The metric may indicate whether the difference in channel gains between the weakest user and the median user is high. This metric may be at least one of quantized received power, reference signal received power, downlink pathloss, pathloss, channel quality indicator, wideband channel quality indicator, RSSI, RSRP, RSRQ, and SINR etc.

The difference between the average sum-rate of users in the group and the broadcasting rate may be computed. It may be configured to send the group information to the group members (e.g., GRNTI of the group) if the computed metric is above, or below, a certain threshold. If the difference is greater than some threshold, it may imply that the spectral efficiency of the broadcast is low, and hence there may be a need to look for another grouping.

In forming the two-level grouping, for example, the requirements of both the common message and private message may need to be taken into account. A two-level broadcast may be formed by making sure that the users in each level of broadcast group have roughly the same channel gains (or some other metric that has less skew among users in the same group), with the average channel gains of the second group higher than the first. This may enable the "private message" sent to the second group to have better rates based on the difference in average channel gains between the second and the first group.

ACK/NACK Feedback for superposition coding may be implemented. The sUAV may need to report the ACK/NACK for superposition coding transmissions. One or more of following may apply for the ACK/NACK reporting. If an error occurs, the sUAV may be configured to report the layer where the error occurred to the eNodeB. It may be known implicitly that all layers prior to this have been successfully received or explicit signaling may be conveyed. For example, if an error occurs, the sUAV may send a NACK for the packet, and the sUAVs may also send the layer information. Similar layer information may be sent along with ACK.

Dynamic multicast service grouping may be implemented. Depending on the geographical location of sUAV and its capability, the number of broadcast groups may be changed dynamically, thereby eNodeB may optimize its resource usage and/or signaling overhead. For example, suppose that there are two geographical regions, each region being serviced by a broadcast group. If there are not many sUAVs in each region, then the regions may be combined to treat the two geographical regions as one extended region, and use one broadcast group to service all the sUAVs. Appropriate signaling (for example, a SIB message) may be sent to indicate this geographical region reconfiguration. The superposition coding capability of sUAV may play a role in deciding the multicast group to which the sUAV belongs. For example, if a sUAV supports superposition decoding, then it may be accommodated in some broadcast group level, rather than placing the sUAV in a "non-layered" broadcast group.

sUAV superposition coding capability may be implemented. The superposition support provided by sUAV may be signaled via the RRC signaling message 'adsb_in_capabilityinformation' report. This may be similar to the 'uecapabilityinformation' report in LTE. It may signify the ADS-B IN like transponder capability for the sUAV. An IE may be provided which may also signify the "maximum number layers" that sUAV may support for superposition coding.

Layering for superposition coding may be implemented. Flexible signaling mechanisms may be utilized to enable efficient spectrum utilization by taking advantage of different sUAVs being serviced. This may be achieved by providing an ability to indicate the number of layers and the order of layer cancellation for effective signal determination. A number of broadcast layers for the sUAV may, if superposition broadcast coding is performed, be equivalent to the number of layers of messages that the sUAV has to decode. Order of layer cancellation may be the order in which layers are to be cancelled so as to be able to decode higher layers. As an example, the order in which GRNTI information is provided may be the order in which the layers are to be canceled for decoding higher layer information.

Physical layer control signaling may be implemented. The downlink control information (DCI) signaling may be extended to indicate all or any of the parameters in any combination to accommodate the superposition coding scenarios.

Similar mechanisms may be extended for the concurrent multicast unicast scenario, for example, one may perform unicast to a sUAV which is a possible retransmission of the previous broadcast message (due to errors), in addition to a new broadcast message common to all members of the group.

A GRNTI could be associated to a geography, a UAV's location, an altitude of operation etc. The associated GRNTI may be received by the UAV along with the preconfigured control information pertaining to the message associated with the GRNTIs such as MCS, physical resource blocks etc., through system information messages.

The UAV may dynamically monitor one or more GRNTIs for receiving broadcast, multiple-level messages based on its speed, heading direction, acceleration, mission type, etc. In an example, if the speed of the UAV is greater than threshold-1, and less than threshold-2, the UAV may monitor one adjacent GRNTI associated with each of the directions (e.g., north, west, south, east) in addition to the GRNTI of its current location. In an example, if the speed of the UAV is greater than threshold-3, the UAV may monitor two adjacent GRNTIs associated in each of the directions in addition to the GRNTI of its current location. In an example, a mission-critical UAV may monitor one or more adjacent GRNTIs associated in each of the directions at all times in its flight path. In an example, a UAV that is travelling northwards with high speed may monitor two additional GRNTIs associated with its immediate location in its northwards direction, while monitoring one GRNTI in other directions, in addition to the GRNTI for its current geographical location.

A UAV may receive multiple level messages, each level associated with different GRNTI, and the UAV may decodes only GRNTIs applicable to it. In an example, the UAV may decode higher levels of messages only if the lower levels are applicable to it. As an example, a UAV may decode the second level message based on whether or not the first level GRNTI is associated to the UAV's geographical location.

A UAV may provide one or more of its position information, speed, and/or heading direction to the network. The network may use the provided information to group the UAVs (for example, such as based on their geographical location) and may perform group-based beamforming to each of the groups. In an example, one UAV in a group may act as a group owner which provides position information etc., of its group members to the network. The network may allocate GRNTI and may perform group-based beamforming. A group owner may provide the centroid of the group periodically, or in a event-triggered fashion (e.g., when one or more group members change their position above a threshold). The network may reconfigure GRNTIs and perform group-based beamforming.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. A processor in association with software may be used to implement a radio frequency transceiver for use in a WTRU, UE, terminal, base station, RNC, and/or any host computer.

The invention claimed is:

1. A wireless transmit/receive unit (WTRU) configured to:
   determine a first group network temporary identifier (GRNTI) wherein the first GRNTI is associated with a broadcast transmission from an eNodeB to a plurality of WTRUs;
   determine a second GRNTI, wherein the second GRNTI is associated with a transmission from the eNodeB to a subset of the plurality of WTRUs that received the first GRNTI;
   receive a multi-level transmission, wherein the multi-level transmission comprises a first level message and a second level message that are sent on a common set of resources using superposition coding;
   decode the first level message from the multi-level transmission using the first GRNTI and preconfigured control information; and
   decode the second level message from the multi-level transmission using the second GRNTI, if the first level message was configured for the WTRU.

2. The WTRU of claim 1, wherein the first GRNTI is indicated using system information.

3. The WTRU of claim 1, wherein the second GRNTI is indicated using a dedicated configuration.

4. The WTRU of claim 1, wherein the WTRU is further configured to cancel the first level message from the multi-level transmission in order to receive the second level message, and using the preconfigured control information from the first level message to decode the second level message.

5. The WTRU of claim 1, wherein the second level message is at least one of a multicast message, a unicast message, and a re-transmission of a message after an error in that message.

6. The WTRU of claim 1, wherein the multi-level transmission is received in accordance with a semi-persistent configuration, and wherein instances of the multi-level transmission are sent using a periodicity defined by the semi-persistent configuration.

7. The WTRU of claim 6, wherein the multi-level transmission includes a bitmap related to the interval allocated for superposition coding.

8. The WTRU of claim 1, wherein the WTRU is an unmanned aerial vehicle (UAV).

9. The WTRU of claim 8, wherein the first level message is an Automatic Dependent Surveillance-Broadcast (ADS-B).

10. The WTRU of claim 8, wherein the subset of the plurality of WTRUs are in a common geographical vicinity or are using a common application.

11. The WTRU of claim 1, wherein the first level message corresponds to a broadcast message, the second level message corresponds to a multicast message, and the WTRU is further configured to:

determine a WTRU-specific RNTI, wherein the WTRU-specific RNTI is associated with a unicast transmission to the WTRU, wherein the multi-level transmission further comprises a third level message that is sent on the common set of resources with the first level-message and the second-level message using superposition coding; and decode the third level message from the multi-level transmission using the WTRU-specific RNTI.

12. The WTRU of claim 11, wherein the WTRU is further configured to cancel the first and second level messages from the multi-level transmission in order to decode the third level message.

13. A method of processing a multi-level transmission sent on a common set of resources using superposition coding, comprising:

determining a first group radio network temporary identifier (GRNTI), wherein the GRNTI is associated with a broadcast transmission from an eNodeB to a plurality of wireless transmit/receive units (WTRUs);

determining a second GRNTI, wherein the second GRNTI is associated with a transmission from the eNodeB to a subset of the plurality of WTRUs that received the first GRNTI;

receiving the multi-level transmission, wherein the multi-level transmission comprises a first level message and a second level message;

decoding the first level message from the multi-level transmission using the first GRNTI and preconfigured control information; and decoding the second level message from the multi-level transmission using the second GRNTI, if the first level message was configured for the WTRU.

14. The method of claim 13, wherein the WTRU decodes the second level message after the first message and first GRNTI is configured for the WTRU.

15. The method of claim 13, wherein the multi-level transmission is received in accordance with a semi-persistent configuration, and wherein instances of the transmission are sent using a periodicity defined by the semi-persistent configuration.

16. The method of claim 15, wherein the multi-level transmission is received and includes a bitmap related to the interval allocated for superposition coding.

17. The method of claim 13, wherein the common set of resources used for transmission of the multi-layer message are defined by a semi-persistent configuration received by one or more of the WTRUs.

18. The method of claim 13, wherein the WTRUs are unmanned aerial vehicles (UAVs) and the first level message is an Automatic Dependent Surveillance-Broadcast (ADS-B).

19. The method of claim 18, wherein the subset of the plurality of WTRUs are in a common geographical vicinity, and the common geographical vicinity comprises a common altitude range.

20. The method of claim 13, wherein the decoding of the second level message from the multi-level transmission is conditioned on the successful decoding the first level message from the multi-level transmission.

* * * * *